United States Patent
Sibecas et al.

(10) Patent No.: US 6,820,126 B2
(45) Date of Patent: Nov. 16, 2004

(54) SYSTEM FOR DYNAMIC PROCESS ASSIGNMENT IN A LOCAL AREA NETWORK AND METHOD THEREFOR

(75) Inventors: Salvador Sibecas, Lake Worth, FL (US); Paul Edward Gorday, West Palm Beach, FL (US); Robert Mark Gorday, Wellington, FL (US); Eric Thomas Eaton, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 815 days.

(21) Appl. No.: 09/828,577

(22) Filed: Apr. 2, 2001

(65) Prior Publication Data

US 2002/0143966 A1 Oct. 3, 2002

(51) Int. Cl.[7] .................. G06F 15/16; G06F 15/173
(52) U.S. Cl. ................. 709/229; 709/202; 709/226; 709/250; 718/104
(58) Field of Search ................. 709/201–203, 709/217–219, 225–230, 250; 718/102–105; 370/230, 312, 338, 390, 463, 469; 455/423–424, 445, 575

(56) References Cited

U.S. PATENT DOCUMENTS

| | | | |
|---|---|---|---|
| 5,341,477 A | * | 8/1994 | Pitkin et al. ............... 709/226 |
| 5,845,116 A | | 12/1998 | Saito et al. ................ 718/103 |
| 6,016,393 A | | 1/2000 | White et al. ............... 719/315 |
| 6,061,744 A | | 5/2000 | Mathur ...................... 719/330 |
| 6,078,959 A | * | 6/2000 | Wright et al. .............. 709/229 |
| 6,163,680 A | * | 12/2000 | Bridle et al. ............ 340/825.2 |
| 6,282,577 B1 | * | 8/2001 | Okanoue et al. ........... 709/250 |
| 6,307,843 B1 | * | 10/2001 | Okanoue .................... 370/312 |
| 6,597,907 B1 | * | 7/2003 | Pruitt et al. ................ 455/423 |
| 6,604,140 B1 | * | 8/2003 | Beck et al. ................ 709/229 |
| 6,735,417 B2 | * | 5/2004 | Fonseca et al. ........... 455/11.1 |

* cited by examiner

Primary Examiner—Bharat Barot
(74) Attorney, Agent, or Firm—Randi L. Karpinia

(57) ABSTRACT

A system (10) for dynamic process assignment among a plurality of devices (40) includes an initial coordinator (38), a requesting device (60), and a resource device (62). The initial coordinator (38) includes a list of available resources (56) for each device of the plurality of devices (40). The requesting device (60) requests the use of a desired resource. In response to the request from the requesting device (60), the initial coordinator (38) identifies an available resource associated with one of the plurality of devices (40) for use by the requesting device (60) as the desired resource.

22 Claims, 5 Drawing Sheets

SYSTEM FOR DYNAMIC PROCESS ASSIGNMENT IN A LOCAL AREA NETWORK AND METHOD THEREFOR

BACKGROUND OF THE INVENTION

1. Field of the Invention

This invention relates in general to wireless communication systems and in particular to wireless communication systems incorporating dynamic process assignment.

2. Description of the Related Art

Short-range wireless communication and personal area networks will soon proliferate in common household products as well as mobile business products. Currently many products that have wireless capability are incompatible. Short-range wireless local area network (WLAN) protocols such as Bluetooth, HomeRF, and IEEE 802.11 provide an avenue towards compatibility. These short-range WLAN protocols operate at lower power and over shorter distances. These short-range WLAN protocols generally use unlicensed spectrum and require minimal coordination with the secondary communication protocol of the device (e.g., GSM, IS-95, IS-136, ReFLEX™, etc.).

Short-range wireless communication can be, for example, provided using an Infrared Data Association (IrDA) communication standard. IrDA is a point-to-point, narrow angle (30 degree cone), ad-hoc data transmission standard designed to operate over a distance of zero (0) to one (1) meter and at speeds of 9600 bits per second to 16 Mega bits per second. Similarly, the short-range communication can be provided using a Bluetooth communication standard. Bluetooth is a short range, point-to-multipoint voice and data transfer standard designed to operate over a nominal distance of ten (10) centimeters to ten (10) meters, but can be extended to one hundred (100) meters by increasing transmit power. Bluetooth operates in the 2.4 Gigahertz radio frequency range.

Short-range WLAN protocols such as IrDA and Bluetooth technology allow for the replacement of the many proprietary cables that connect one device to another with one universal short-range radio link. Short range WLAN protocol technology could replace the cumbersome cables used today to connect a laptop to a cellular telephone or between other devices such as printers, personal digital assistants, desktops, fax machines, keyboards, joysticks or virtually any other digital device. Refrigerators, microwave ovens, dish washers, laundry washers & dryers, stereo, television, digital video disks, video games, lighting, irrigation, cooling and heating systems among others may also take advantage of such short-range radio links.

Potential applications of these low-power, short-range, protocols are wireless connection of peripherals devices, high-speed data transfers to desktop computers and wireline networks, and establishment of short-range "ad hoc networks" between similar wireless communication devices. Two or more units sharing the same channel is called an ad hoc network. In an ad hoc network one of the units functions as the master while the others function as slaves. For example, in a Bluetooth system, up to seven active slaves can exist in an ad hoc network but many more can remain locked to the same master in a so-called parked state. These parked units cannot be active on the channel, but remain synchronized to the master. The master always controls the channel access for both the active and the parked units. The master in a Bluetooth system controls the traffic across the channel using a polling scheme. Once an ad hoc network has been established, master-slave roles can be exchanged. To avoid collisions, communication between two slaves can only be accomplished through the master unit.

Many short-range communication WLANs such as the Bluetooth system further supports scatternets. A scatternet is the combination of two or more ad hoc networks with overlapping coverage area. Each ad hoc network can only have one master. However, a master in one ad hoc network can participate as a slave in another and slaves can also participate in different ad hoc networks on a time division multiplex basis. Ad hoc networks within a scatternet are not time or frequency synchronized. Each ad hoc network uses its own hopping sequence.

The devices participating in an ad hoc network each include different processes capabilities. For example, some have more processing power, some have access to an unlimited power source, and some include a variety of powerful applications. Further, usage profiles vary for each device. For example, printers may have a low usage profile and thus have some additional free computing time. Similarly, the personal computer in an office may have a high usage profile but may be the only device that has a particular application on board. One personal computer may have access to a higher speed modem.

What is needed is a system and method for dynamically assigning processes within a WLAN such as an ad hoc network to optimize the shared capabilities of each individual unit within the network.

BRIEF DESCRIPTION OF THE SEVERAL VIEWS OF THE DRAWINGS

The present invention will be described by way of exemplary embodiments, but not limitations, illustrated in the accompanying drawings in which like references denote similar elements, and in which.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Figure 1:
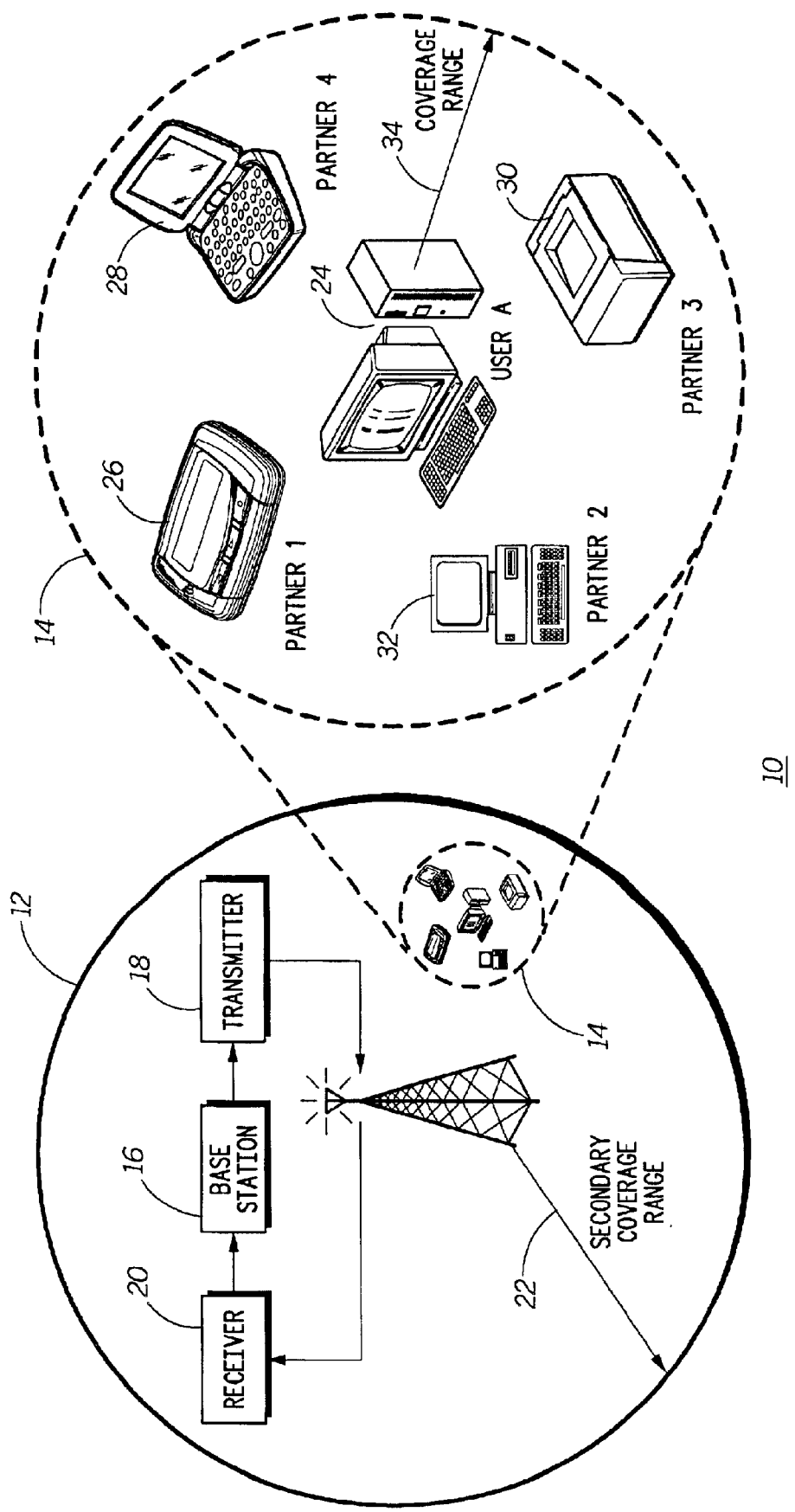
FIG. 1 is a block diagram of a communication system having devices that operate on both a short range and a secondary protocol.

Referring to FIG. 1, a communication system 10 having devices that operate on a short-range protocol system 14 and preferably on a secondary protocol system 12 is illustrated. The secondary protocol system 12 as shown in FIG. 1 includes a base station 16 with a co-located base transmitter 18 and base receiver 20 covering a wide area range 22 as shown. A typical secondary protocol could be Motorola's ReFLEX™ messaging protocol.

It will be appreciated by one of ordinary skill in the art that the secondary protocol system 12, in accordance with the present invention, can function utilizing any wireless RF channel, for example, a one or two-way pager channel, a mobile cellular telephone channel, or a mobile radio channel. Similarly, it will be appreciated by one of ordinary skill in the art that the secondary protocol system 12 can function utilizing other types of communication channels such as infrared channels, audio channels, and local area networks. In the following description, the term "secondary protocol system" refers to any of the systems mentioned above or an equivalent.

In one embodiment, each of the devices (i.e.: a personal computer 24, a wireless communication device 26, a personal digital assistant 28, a printer 30, and a computer 32) is a device using a short-range WLAN protocol, such as Bluetooth technology. It will be appreciated by one of ordinary skill in the art that the short-range WLAN protocol, in accordance with the present invention, can function utilizing any short-range wireless protocol such as IrDA, HomeRF, and IEEE 802.11. Using the short-range WLAN protocol, each device will establish a list of "partners", Using the short-range WLAN protocol, a first device, such as the personal computer 24 (User A), and one or more of the potential partner devices (the wireless communication device 26, the personal digital assistant 28, the printer 30, or the computer 32) agree to form an ad-hoc network.

This network is defined by a list of active partners stored in Unit A. The list may contain available resources for each device, including battery life, access to wide area networks, application availability, utilization, etc.

Figure 2:
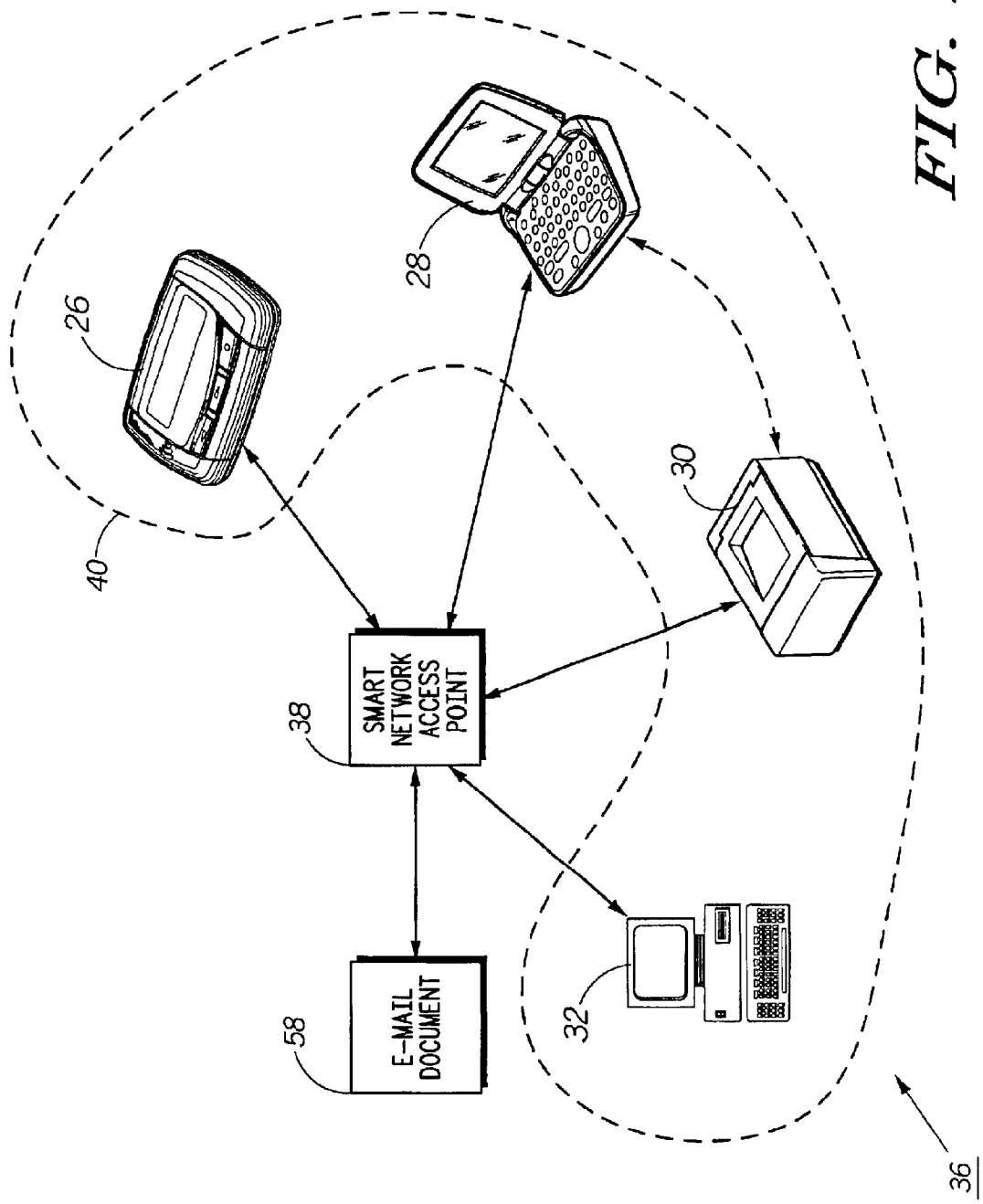
FIG. 2 is a block diagram of a block diagram of an ad hoc network for use within the communication system of FIG. 1.

FIG. 2 is a block diagram of an ad-hoc network 36 for use within the communication system 10 of FIG. 1 in accordance with the present invention. The ad hoc network 36, for example, can be a subset of the short-range protocol system 14 of FIG. 1. The ad hoc network 36 includes a plurality of devices 40 such as the wireless communication device 26, the personal digital assistant 28, the printer 30, and the computer 32. In one embodiment, as illustrated in FIG. 2, the ad hoc network 36 further includes a smart network access point 38. Within the ad hoc network 36 of FIG. 2, an initial coordinator functions as the master and the plurality of devices 40 function as the slaves. The initial coordinator, for example, can be the smart network access point 38 or alternatively, the initial coordinator can be one of the plurality of devices 40.

It will be appreciated by one of ordinary skill in the art that each of the plurality of devices 40 in accordance with the present invention, can be a mobile cellular telephone, a mobile radio data terminal, a mobile cellular telephone having an attached data terminal, or a two way pager, such as the "Pagewriter 2000X" manufactured by Motorola Inc. of Schaumburg, Ill. Similarly, each of the plurality of devices 40, in accordance with the present invention, can be a printer, a personal computer, or a personal digital assistant. In the following description, the term "device" refers to any of the devices mentioned above or an equivalent.

It will be further appreciated by one of ordinary skill in the art that the ad hoc network 36 can include only the plurality of devices 40 in one embodiment without the use of the smart network access point 38. In this alternative embodiment, one or more of the plurality of devices can take the role of initial coordinator or resource manager.

Figure 3:
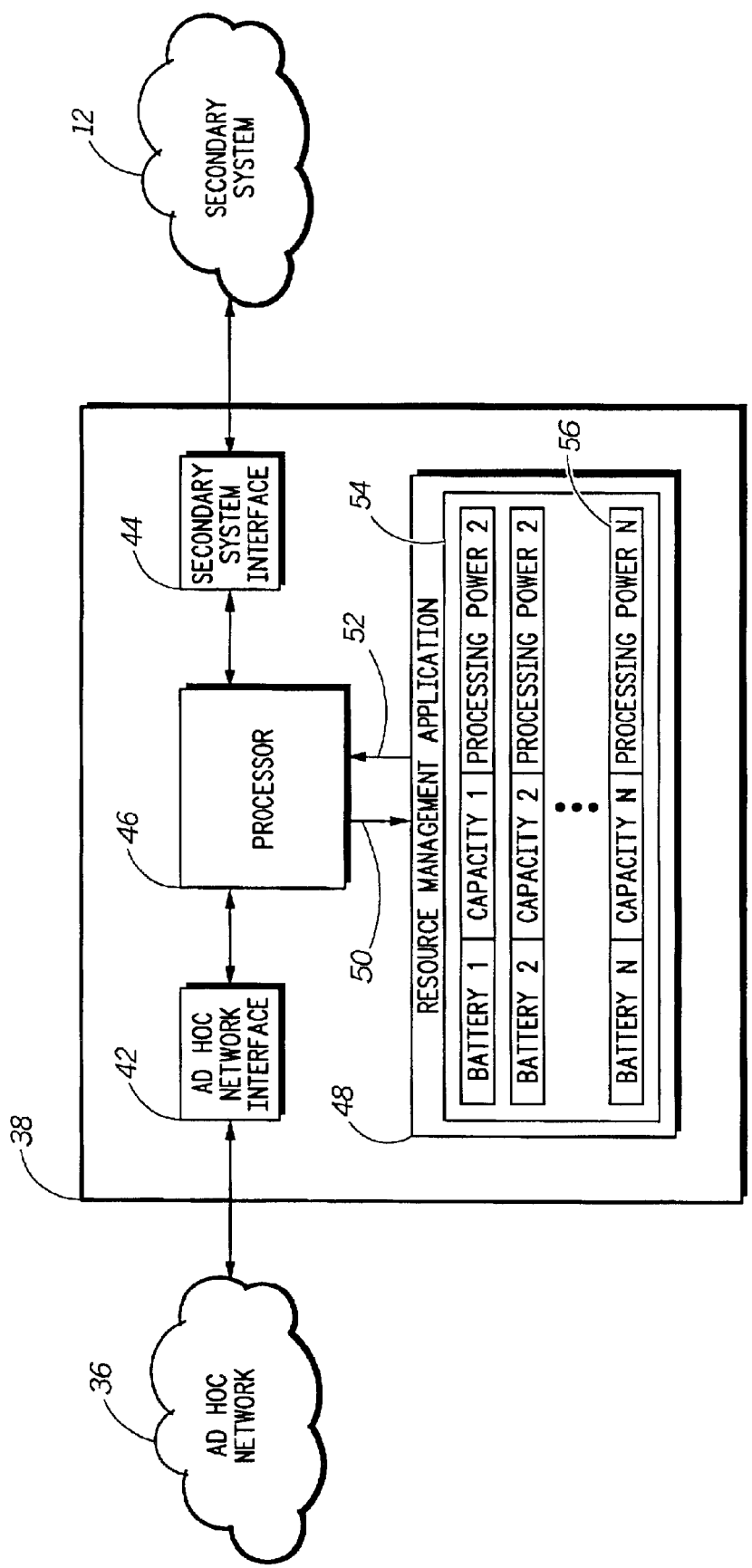
FIG. 3 is a block diagram of a smart network access point for use in the ad hoc network of FIG. 2 in accordance with the present invention.

As illustrated in FIG. 3 in an embodiment where the smart network access point 38 functions as the initial coordinator, the smart network access point 38 preferably functions as a transformer from the short-range WLAN protocol to the secondary network 12 such as a local area network (LAN) or a wireless communication system (see FIG. 1). It will be appreciated by one of ordinary skill in the art that one of the plurality of devices 40 alternatively can function as the initial coordinator and that the functionality described herein for the smart network access point 38 can equally apply to one of the plurality of devices 40. The smart network access point 38 includes an ad hoc network interface 42, a secondary system interface 44, a processor 46 and a resource management application 48.

Coupled to the ad hoc network interface 42 and the secondary system interface 44 is the processor 46 utilizing conventional signal-processing techniques for processing received information. Preferably, the processor 46 is similar to the MC68328 micro controller manufactured by Motorola, Inc. of Schaumburg, Ill. It will be appreciated by one of ordinary skill in the art that other similar processors can be utilized for the processor 46, and that additional processors of the same or alternative type can be utilized as required to handle the processing requirements of the processor 46.

In a preferred embodiment, the initial coordinator, such as the smart network access point 38, includes the resource management application 48 coupled to the processor 46. The smart network access point 38 performs resource management functions within the resource management application 48 using a processor command 50 sent from the processor 46. The resource management application 48 sends an application response 52 in reply to the processor command 50. The resource management application 48 preferably includes a resource-tracking list 54. The resource management application 48 can be hard coded or programmed into the smart network access point 38 during manufacturing, can be programmed over-the-air upon customer subscription, or can be a downloadable application. It will be appreciated by one of ordinary skill in the art that other programming methods can be utilized for programming the resource management application 48 into the smart network access point 38.

The resource management application 48 preferably is programmed to enable utilization of a required resource from the resource-tracking list 54. The resource-tracking list 54 includes a plurality of resource information 56 for each of the plurality of devices 40 of the ad hoc network 36. For example, the plurality of resource information 56 can include device battery life, device battery capacity, device processing power, and access to the secondary network for each of the plurality of devices 40. The resource management application 48, in response to the processor command 50, preferably accesses the resource-tracking list 54. The resource management application 48 is programmed to identify an available resource from the resource-tracking list 54 using the plurality of resource information 56 stored in the resource-tracking list 54 by using predetermined algorithms, as is well known in the art. The resource management application 48 is preferably programmed with a set of rules identifying the resource to allocate in response to the processor command 50. When the resource management application 48 identifies the available resource, the resource management application 48 sends the application response 52 to the processor 46. The processor 46, in response to receipt of the application response 52, enables the use of the available resource by the requesting device.

Referring back to FIG. 2, the present invention provides a novel way of dynamically assigning a particular task to one of the plurality of devices 40 within the ad hoc network 36. For example, as illustrated in FIG. 2, the smart network access point 38 can be located in a public place and the plurality of devices 40 can initially be three devices, for example, the personal digital assistant 28, the printer 30, and the computer 32. The smart network access point 38 and each of the plurality of devices 40 preferably operate using one of many secondary, short-range WLAN protocols as described herein. It will be appreciated by one of ordinary skill in the art that the secondary, short-range WLAN protocol, in accordance with the present invention, can function utilizing any short-range wireless protocol such as Bluetooth, IrDA, HomeRF, and IEEE 802.11. When a fourth device, such as the wireless communication device 26, comes within the range of the smart network access point 38, it can decide to become part of the ad hoc network 36. For example, it can request to be a member of the ad hoc network 36 for the purpose of downloading a long electronic mail document 58 (E-mail) originally written in a language other than English. The smart network access point 38 processes the request from the wireless communication device 26 and identity from the resource-tracking list 54 (see FIG. 3) of the smart network access point 38, the available resource to translate the E-mail document 58. Further it instructs the resource identified to translate the email where to return the translated email.

For example, when the smart network access point 38 has greater resources available (memory, processing power, energy source) than the other plurality of devices 40, the smart network access point 38 can run the translation application to translate the E-mail document 58, while still serving the other three devices.

Alternatively, when the capacity of the smart network access point 38 is low but still has enough processing power to download the document into another device such as the wireless communication device 26 but not run the application, the smart network access point 38 can assign the wireless communication device 26 to run the translation application itself to translate the E-mail document 58.

Alternatively, when both the capacity of the smart network access point 38 and the battery life of the wireless communication device 26 are low, the smart network access point 38 downloads the E-mail document 58 to another device within the ad hoc network 36 that is capable of running the application such as the computer 32. Once the computer 32 completes the task, it sends the translated document back to the smart network access point 38, which forwards this information to the wireless communication device 26. Alternatively, the computer 32 sends the translated document directly to the wireless communication device 26.

Figure 4:
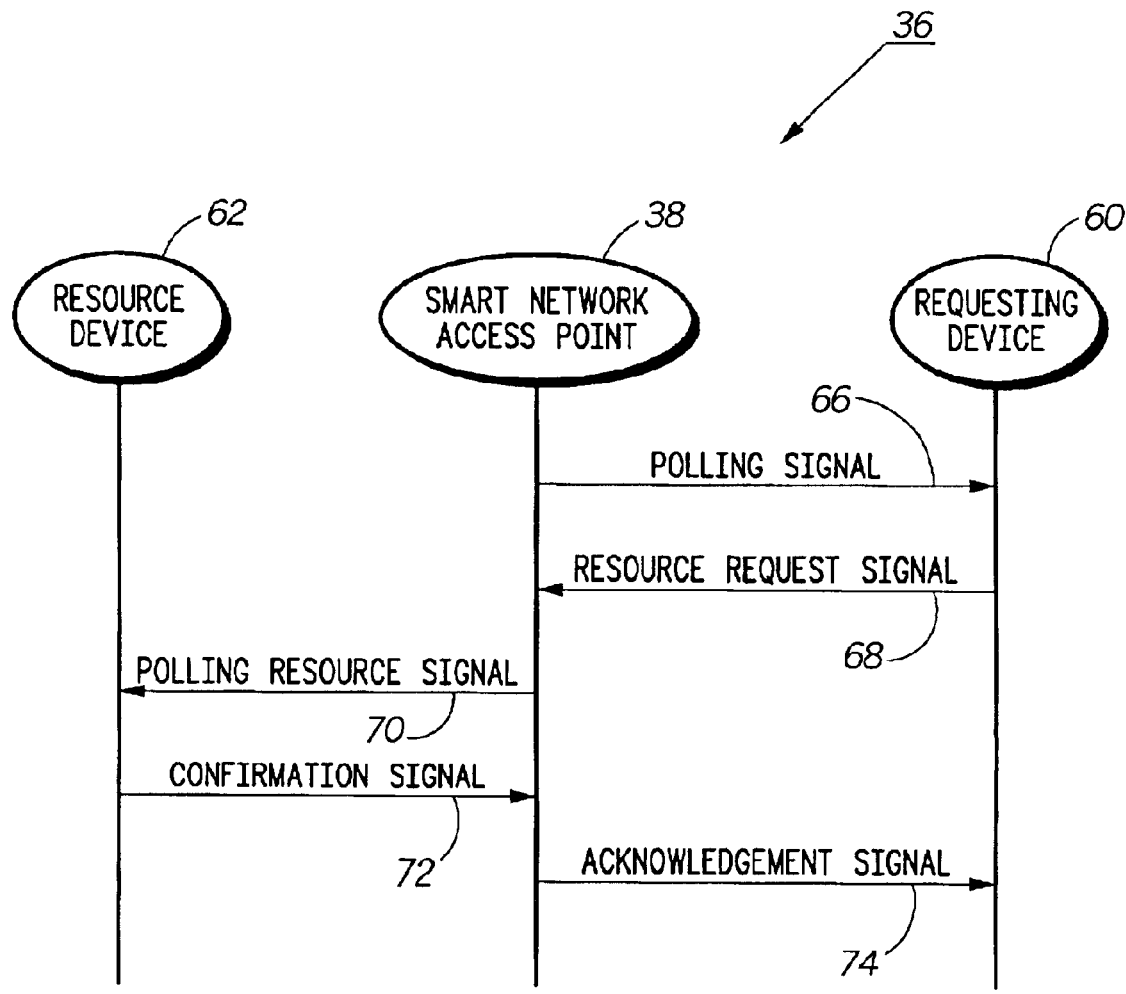
FIG. 4 illustrates the communication between devices within the ad hoc network of FIG. 2 in accordance with the present invention.

FIG. 4 illustrates one embodiment of the communication between the smart network access point 38, a requesting device 60, and a resource device 62 of the ad hoc network 36. In FIG. 4, the smart network access point 38 polls the requesting device 60 by transmitting polling signal 66 in an occupied bandwidth. Preferably, this transmission is of a standard Bluetooth 1.0 type transmission or an equivalent. The requesting device 60, in response, requests a resource 64 that is dynamically selected by the smart network access point 38. Initially, it is assumed that a polling signal 66 sent from the smart network access point 38 has just arrived at the requesting device 60 and the smart network access point 38 is maintaining the ad hoc network 36, e.g., polling the plurality of devices 40 (not shown). When a poll by the smart network access point 38 is not scheduled, the requesting device 60 utilizes its internal resources for performing required tasks.

It will be appreciated by one of ordinary skill in the art that alternatively, the initial coordinator, for example the smart network access point 38 or one of the plurality of devices 40 sets the communication between two devices of the ad hoc network and thereafter the two devices communicate directly with each other without the interference of the initial coordinator.

It will be appreciated by one of ordinary skill in the art that the transmission, in accordance with the present invention, can function utilizing any short-range wireless protocol such as IrDA, HomeRF, and IEEE 802.11. The requesting device 60 then sends a resource request signal 68 to requests the usage of a resource from the ad hoc network 36 to the smart network access point 38. The smart network access point 38 identifies the available resource within the ad hoc network 36 and sends a polling resource signal 70 to the resource device 62 to confirm use of the selected resource of the resource device 62. The resource device 62 then sends a confirmation signal 72 to the smart network access point 38. When the smart network access point 38 finds an acceptable resource, the smart network access point 38 sends an acknowledgement signal 74 acknowledging the request of the requesting device 60 including identification of the resource device 62. When the smart network access point 38 finds the resource identified as unacceptable, the smart network access point 38 will ideally search the resource-tracking list 54 for the best alternative, which is then sent to the requesting device 60.

Figure 5:
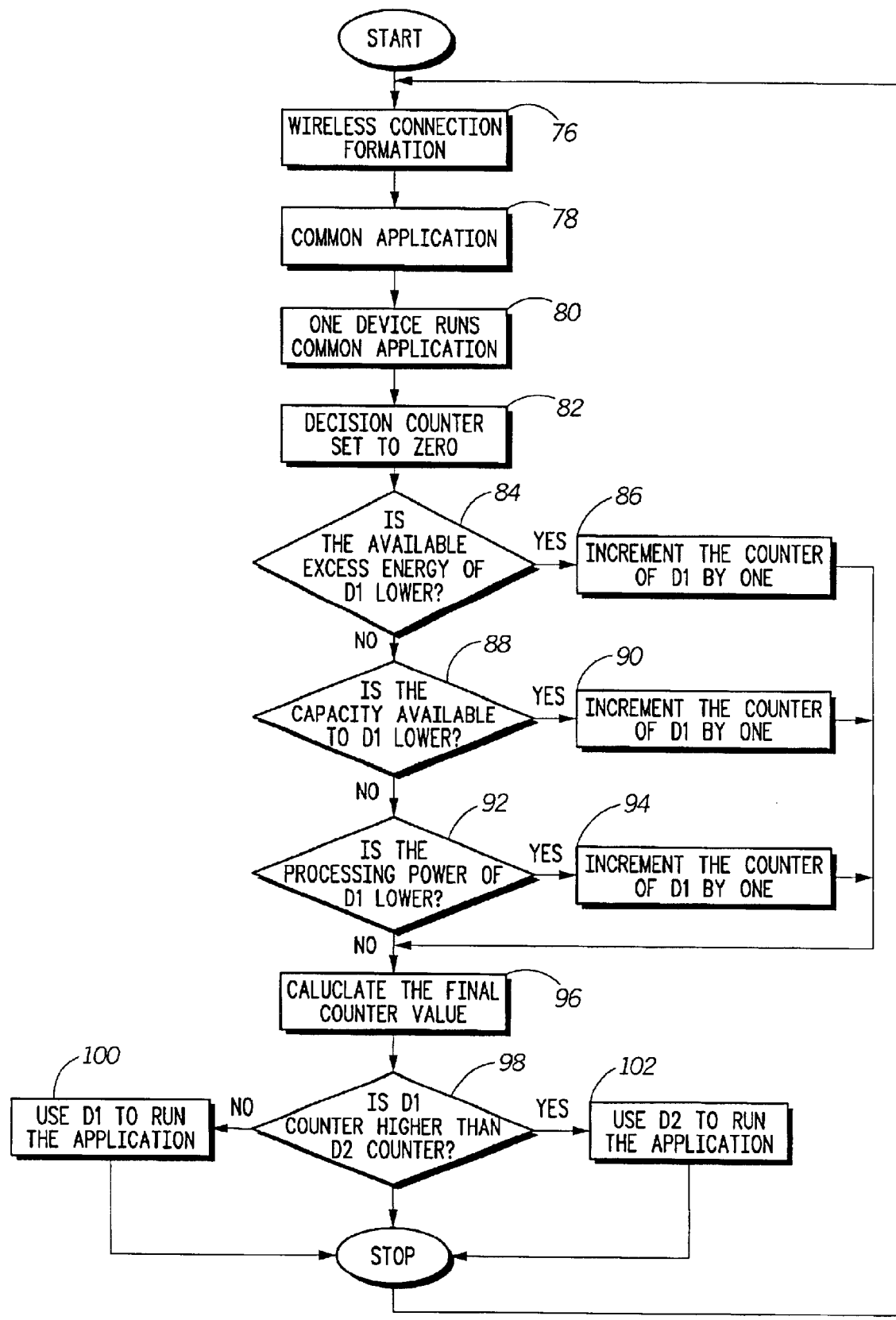
FIG. 5 is a flow chart illustrating the operation of the ad hoc network of FIG. 2 in accordance with the present invention.

FIG. 5 is a flow chart illustrating the one embodiment of the operation of the ad hoc network 36 of FIG. 2 in accordance with the present invention. In Step 76, a wireless connection is formed between two devices using one a WLAN protocol. Next, in Step 78, the two devices have stored in memory a common application. Alternatively, one or both devices can have access to the common application via the secondary protocol system 12. Next, in Step 80, one of the devices decides to run the common application. Next, in Step 82, both devices set a decision counter to zero. Next, in Step 84, the available excess energy of the two devices is compared. For example, one of the devices can have access to an unlimited power source. In this case, the use of this unlimited power source overrides the currently available energy capacity of the other device. In Step 86, when the battery life of the first device (D1) is lower than the second device (D2), the counter of D1 is incremented by one. In Step 88, when the battery life of D1 is greater than the battery life of D2, the available capacity of the two devices is compared. In Step 90, when the capacity of D1 is lower than the capacity of D2, the counter of D1 is incremented by one. In Step 92, when the capacity of D1 is greater than the capacity of D2, the processing power of the two devices is compared. In Step 94, when the capacity of D1 is lower than the capacity of D2, the counter of D1 is incremented by one. When the processing power of D1 is greater than the processing power of D2 in Step 92, and when the counter of D1 has been incremented by one in Steps 86, 90, and 94, next, in Step 96, the final counter value is calculated. Next, in Step 98, the counter value of D1 is compared to the counter value of D2. In Step 100, when the counter value of D1 is lower than the counter value of D2, D1 is used to run the common application. In Step 102, when the counter value of D1 is higher than the counter value of D2, D2 is used to run the common application. The process then resets to begin again at Step 76.

To illustrate the method of the present invention, consider a video cellular telephone, which has an application to perform the MPEG4 video compression and decompression. The raw video signal can require a data rate (bandwidth) of several hundred kilobits per second (kbps). When compressed, the video signal can require as little as 28.8 kbps, depending upon the quality and size of the video image. For macro-cellular connections (i.e.: GSM cellular network) the compressed signal is transmitted over the wireless channel for bandwidth efficiency, in order to support many users. The videophone performs both MPEG4 compression and decompression for transmitting and receiving the video signal. The same phone can also be used on a WLAN, which can support higher bandwidths, and typically fewer users. When the video phone connects with the smart network access point 38 using the WLAN protocol, the phone and the smart network access point 38 can communicate regarding available bandwidth, MIPs capabilities and devices' processors, and user battery status. As a result, the devices can make a decision for the smart network access point to do the processing intensive MPEG4 video compression and decompression and then transmit the uncompressed video signal to the user's device with a higher bandwidth WLAN protocol. This saves battery power and potentially speeds up the video processing at the expense of consuming WLAN bandwidth and processing resources of the smart network access point. The decision of the smart network access point to perform the video compression and decompression can be made on a frame by frame basis, so the smart network access point 38 can continue to handle other processes intermittently.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. An ad hoc network for dynamic process assignment among a plurality of devices, the ad hoc network comprising:
   a first device, wherein the first device functions as a resource manager, and further wherein the first device includes a list of available resources for each device of the plurality of devices; and
   a second device, wherein the second device requests the use of a desired resource,
   wherein, the first device, in response to the request from the second device identifies an available resource associated with one of the plurality of devices for use by the second device as the desired resource.

2. The ad hoc network for dynamic process assignment as recited in claim 1 wherein the first device instructs the one of the plurality of devices to allow the use of its available resource by the second device in response to the first device identifying the available resource.

3. The ad hoc network for dynamic process assignment as recited in claim 1 further comprising a smart network access point, wherein the smart network access point functions as the resource manager.

4. The ad hoc network for dynamic process assignment as recited in claim 3, wherein the smart network access point comprises:
   an ad hoc network interface,
   a secondary system interface,
   a processor coupled between the ad hoc network interface and the secondary system interface, wherein the processor functions as a transformer between the ad hoc network interface and the secondary system, and
   a resource management application coupled to the processor, wherein the resource management application includes a resource-tracking list having a plurality of resource information for each of the plurality of devices of the ad hoc network.

5. The ad hoc network for dynamic process alignment as recited in claim 1 wherein at least one of the plurality of devices operates using a short-range wireless local area network protocol.

6. The ad hoc network for dynamic process alignment as recited in claim 5 wherein the short-range wireless local area network protocol is a Bluetooth protocol.

7. The ad hoc network for dynamic process alignment as recited in claim 1 wherein the resource manager collects and automatically provides the list of available resources to the plurality of devices, and further wherein each of the plurality of devices stores the list of available resources.

8. A communication system for dynamic process assignment comprising:
   a secondary protocol system; and
   a short-range wireless local area network protocol system including a plurality of devices, the short-range local area network protocol system comprising:
      a first device, wherein the first device functions as a resource manager, and further wherein the first device includes a list of available resources for each device of the plurality of devices; and
      a second device, wherein the second device requests the use of a desired resource,
      wherein, the first device, in response to the request from the second device identifies an available resource associated with one of the plurality of devices for use by the second device as the desired resource.

9. The communication system for dynamic process assignment as recited in claim 8 wherein the short-range wireless local area network protocol system operates using a Bluetooth protocol.

10. The communication system for dynamic process assignment as recited in claim 8 wherein the resource manager collects and automatically provides the list of available resources to the plurality of devices, and further wherein each of the plurality of devices stores the list of available resources.

11. The communication system for dynamic process assignment as recited in claim 8 wherein the first device, in response to the request from the second device identifies an available resource associated with the secondary protocol system for use by the second device as the desired resource.

12. The communication system for dynamic process assignment as recited in claim 8 further comprising a smart network access point, wherein the smart network access point functions as the resource manager.

13. The communication system for dynamic process assignment as recited in claim 12, wherein the smart network access point comprises:
   an ad hoc network interface,
   a secondary system interface,
   a processor coupled between the ad hoc network interface and the secondary system interface, wherein the processor functions as a transformer between the ad hoc network interface and the secondary system, and a resource management application coupled to the processor, wherein the resource management application includes a resource-tracking list having a plurality of resource information for each of the plurality of devices of the ad hoc network.

14. Within an ad hoc network, a method for dynamic process assignment among a plurality of devices, the method comprising:

requesting a desired resource by a requesting device sending a resource request signal;

identifying an available resource of a resource device within the plurality of devices corresponding to the desired resource;

sending a polling resource signal to the resource device to confirm the use of the available resource by the requesting device;

sending a confirmation signal by the resource device to the requesting device.

15. The method for dynamic process assignment among a plurality of devices as recited in claim 14 wherein the sending a polling resource signal step further comprises confirming the availability of the resource device within the ad hoc network.

16. The method for dynamic process assignment among a plurality of devices as recited in claim 14 further comprising the step of sending a level of available resources signal by the resource device to the requesting device prior to the sending a confirmation signal step.

17. Within an ad hoc network, a method for dynamic process assignment among a plurality of devices including an initial coordinator, a requesting device, and a resource device, the method comprising:

polling the requesting device by the initial coordinator transmitting a polling signal in an occupied bandwidth;

requesting a desired resource by a requesting device sending a resource request signal to the initial coordinator;

identifying an available resource of a resource device within the plurality of devices corresponding to the desired resource by the initial coordinator;

sending a polling resource signal by the initial coordinator to the resource device to confirm the use of the available resource by the requesting device;

sending a confirmation signal by the resource device to the initial coordinator; and sending an acknowledgment signal including identification of the resource device by the initial coordinator to the requesting device.

18. The method for dynamic process assignment among a plurality of devices as recited in claim 17 wherein the occupied bandwidth of the polling step comprises a Bluetooth protocol.

19. The method for dynamic process assignment among a plurality of devices as recited in claim 17 wherein the confirmation signal includes a list of available resources within the resource device, the method further comprising:

exchanging the resource device for the initial coordinator when the resource device includes more available resources than the initial coordinator.

20. The method for dynamic process assignment among a plurality of devices as recited in claim 17 further comprising:

searching a resource tracking list for an alternative resource by the initial coordinator when the confirmation signal by the resource device is negative before the acknowledgement step.

21. The method for dynamic process assignment among a plurality of devices as recited in claim 17 further comprising:

identifying an alternative resource by identifying available resources within each of the plurality of devices by the initial coordinator when the confirmation signal by the resource device is negative before the acknowledgement step.

22. The method for dynamic process assignment among a plurality of devices as recited in claim 21 wherein the available resources include processing power, access to an unlimited power source, access to a secondary protocol system, and an application capability.

* * * * *